Dec. 11, 1951 A. LORENZ 2,578,311

RECLINING ARTICLE OF FURNITURE

Filed Jan. 12, 1946 8 Sheets-Sheet 1

INVENTOR.
Anton Lorenz
BY
his ATTORNEY

INVENTOR.
ANTON LORENZ

BY [signature]

his ATTORNEY

Dec. 11, 1951 A. LORENZ 2,578,311

RECLINING ARTICLE OF FURNITURE

Filed Jan. 12, 1946 8 Sheets-Sheet 3

INVENTOR.
ANTON LORENZ
BY [signature]
his ATTORNEY

Dec. 11, 1951 A. LORENZ 2,578,311

RECLINING ARTICLE OF FURNITURE

Filed Jan. 12, 1946 8 Sheets-Sheet 4

INVENTOR.
ANTON LORENZ

BY [signature]

His ATTORNEY

Dec. 11, 1951 A. LORENZ 2,578,311

RECLINING ARTICLE OF FURNITURE

Filed Jan. 12, 1946 8 Sheets-Sheet 5

INVENTOR.
ANTON LORENZ

BY his ATTORNEY

Dec. 11, 1951 A. LORENZ 2,578,311

RECLINING ARTICLE OF FURNITURE

Filed Jan. 12, 1946 8 Sheets-Sheet 6

INVENTOR.
ANTON LORENZ

BY [signature]

his ATTORNEY

INVENTOR.
ANTON LORENZ

BY his ATTORNEY

Dec. 11, 1951 A. LORENZ 2,578,311

RECLINING ARTICLE OF FURNITURE

Filed Jan. 12, 1946 8 Sheets-Sheet 8

INVENTOR.
ANTON LORENZ

BY [signature]

his ATTORNEY

Patented Dec. 11, 1951 2,578,311

UNITED STATES PATENT OFFICE 2,578,311

RECLINING ARTICLE OF FURNITURE

Anton Lorenz, Buffalo, N. Y.

Application January 12, 1946, Serial No. 640,695

18 Claims. (Cl. 155—105)

Figure 1:
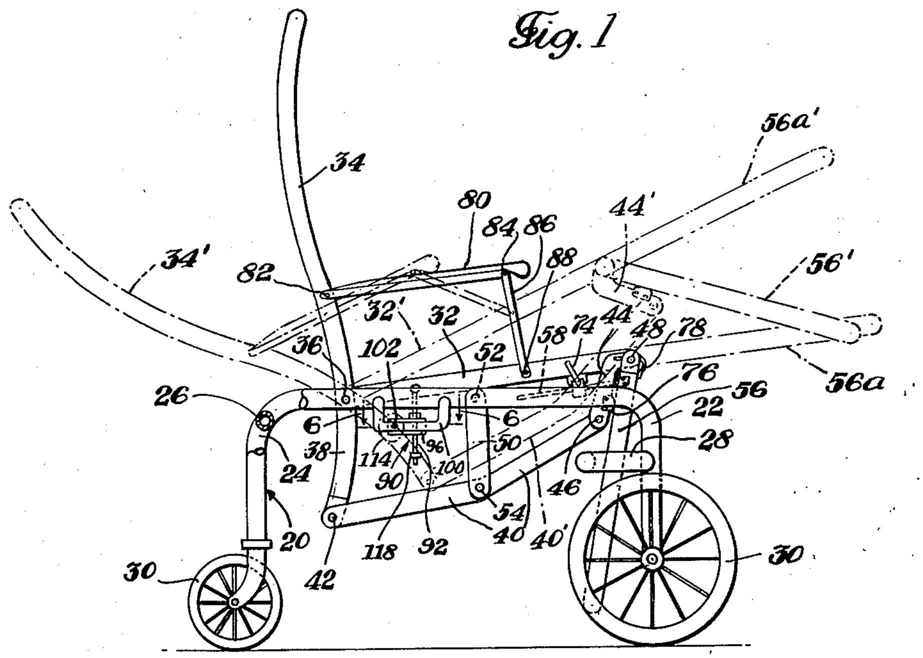

The present invention relates to furniture and more particularly to a reclining article of furniture, wherein a back-rest and seat form movable members of a polygonal link-system swingably mounted on a support, wherein the movements of the members of said polygonal link-system are positively controlled by a controlling mechanism operatively connected with said support and a member of the polygonal link-system, and wherein the movements of a leg-rest pivoted to the seat are controlled by controlling means operatively connected with a member of the polygonal link-system and the leg-rest.

An object of the present invention is to provide a reclining article of furniture of above described type, wherein, in use, either said control of the movements of the leg-rest may be rendered active, or said control may be rendered ineffective and the leg-rest may be held at a predetermined angle relative to the seat during changes in the position of the seat forming a member of the polygonal link-system.

Another object of the present invention is to provide a reclining article of furniture of above described type, wherein the angle between the leg-rest and the seat may be adjusted to a predetermined degree when the control of the leg-rest by the controlling means is rendered ineffective.

Still another object of the present invention is to provide a reclining article of furniture of above described type, wherein such adjustments of the angle between the leg-rest and the seat may be made by the occupant while resting in the article of furniture.

A further object of the present invention is to provide a reclining article of furniture of above described type, wherein the angle between the leg-rest and the seat may be altered without rendering ineffective the control of the leg-rest by the controlling means.

Still another object of the present invention is to equip a reclining article of furniture of above described type with controlling means, which may cause a movement of the leg-rest relative to the seat, when the position of the polygonal link-system is altered, which, however, do not form a positive connection between the leg-rest and its controlling means and permit an independent movement of the leg-rest relative to the seat when the members of the polygonal link-system are held in a certain position relative to each other.

A further object of the present invention is to provide a reclining chair of above described type, which may be readily converted into a couch-like furniture.

Another object of the present invention is to equip a reclining chair of above described type with means for adjusting the seat at a predetermined level above the ground.

A further object of the present invention is to provide a reclining wheel chair of above described type, the body carrying elements of which, i. e. the back-rest, the seat, and the leg-rest, may be temporarily adjusted in alignment with each other and at equal level with a bed for an easy and comfortable transport of a sick person from the bed onto the then converted wheel chair, whereupon the wheel chair may be reconverted and readjusted for use as a reclining wheel chair.

Still another object of the present invention is to improve upon the art of reclining articles of furniture as now ordinarily made.

My invention consists in certain novel features of construction of my improvements as will be hereinafter fully described.

Figure 2:
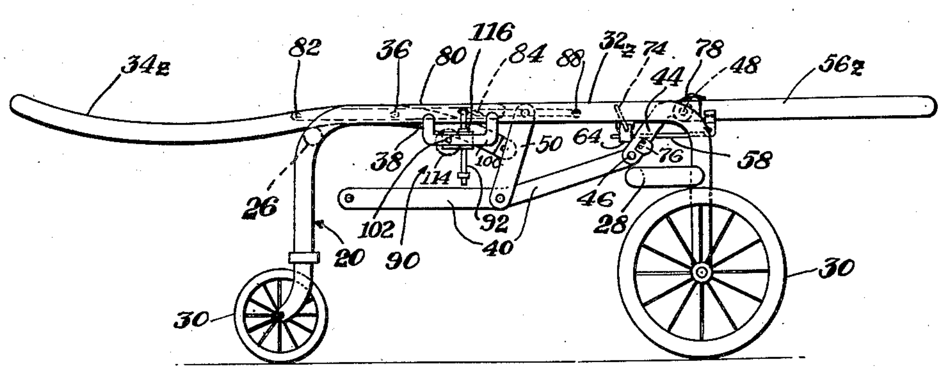

The above mentioned objects and advantages as well as other objects and advantages will be more fully disclosed in the following specification, reference being had to the accompanying drawings, forming part of this specification, wherein:

Fig. 1 is a side elevational view of a reclining wheel chair according to the invention, Fig. 2 is a side elevational view of the wheel chair, wherein, however, the wheel chair is converted into a couch-like furniture.

Figures 3, 23:
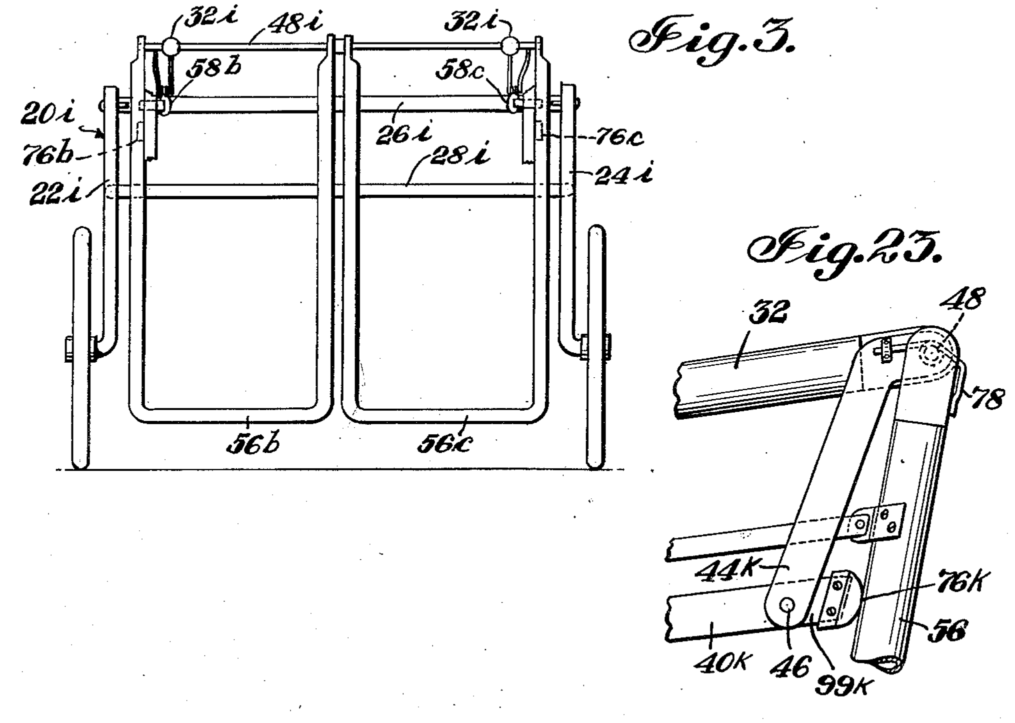
Figure 4:
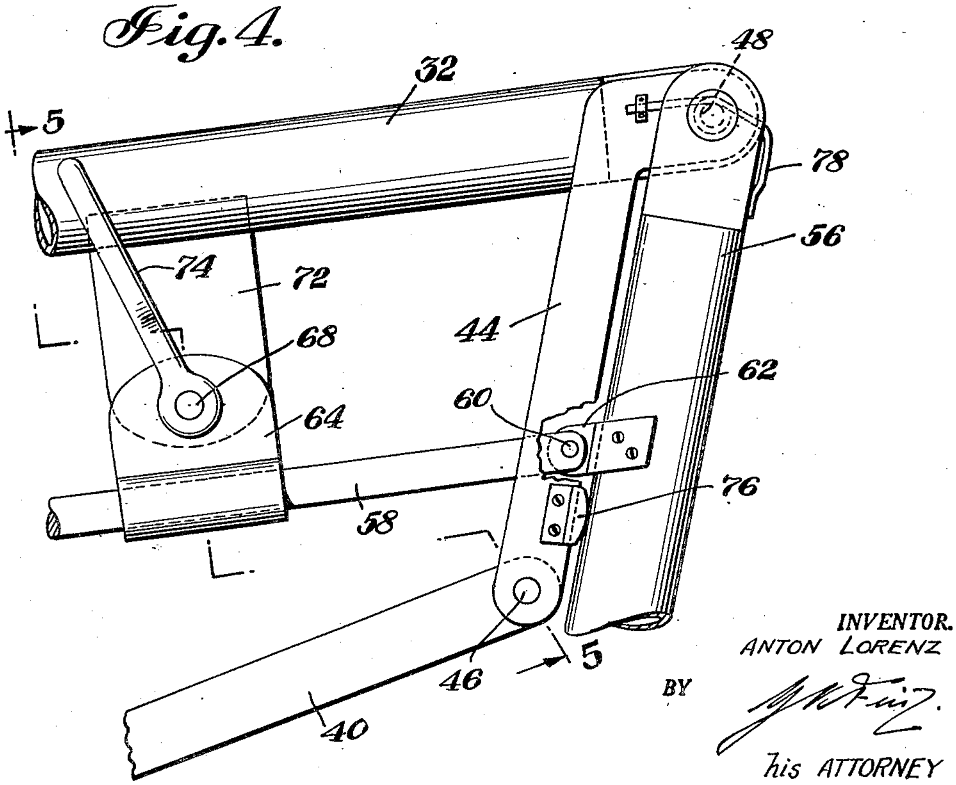
Figure 5:
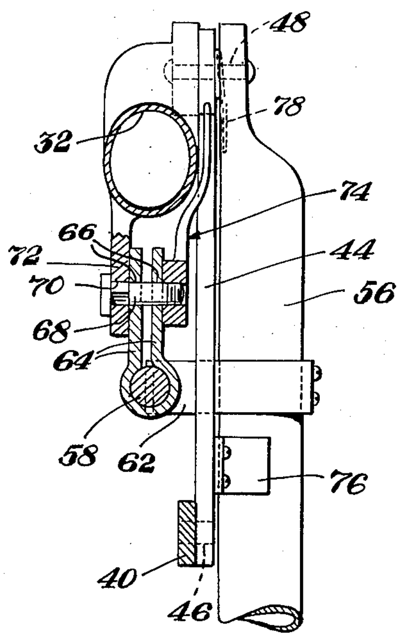
Figure 6:
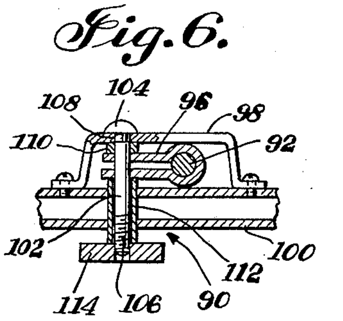
Figure 7:
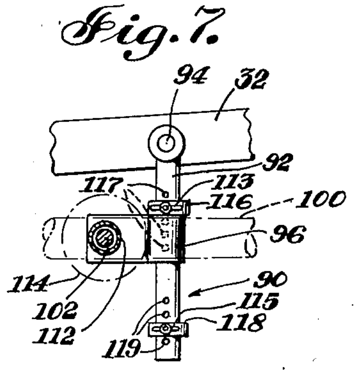

Fig. 3 is a fragmentary front elevational view of a different embodiment of a wheel chair, wherein the leg-rest comprises two separate parts, Fig. 4 is an enlarged view of the controlling means and of the holding device for the leg-rest of the wheel chair shown in Fig. 1, Fig. 5 is a sectional view of the detail shown in Fig. 4 taken on line 5—5 of Fig. 4, Fig. 6 is a sectional view of the locking device of the wheel chair shown in Fig. 1, taken on line 6—6 of Fig. 1, Fig. 7 is a front elevational view of the locking device shown in Fig. 6.

Figures 8, 9, 10:
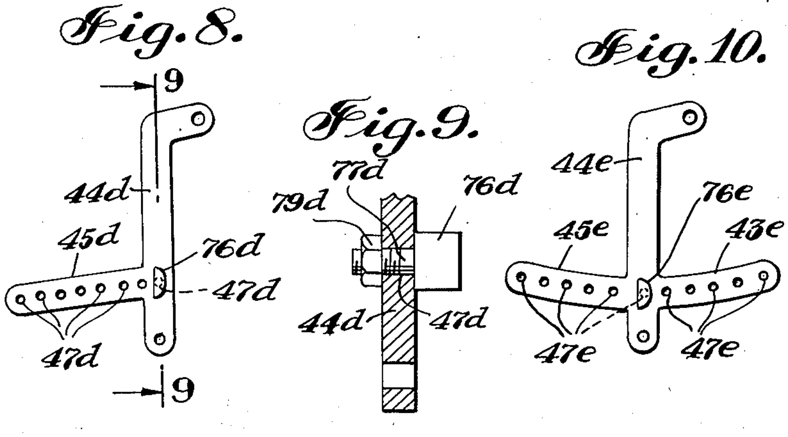
Figure 11:
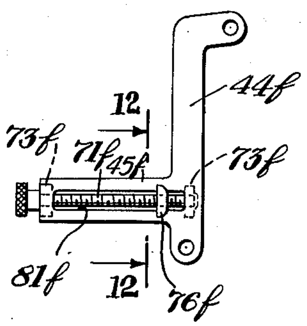
Figure 12:
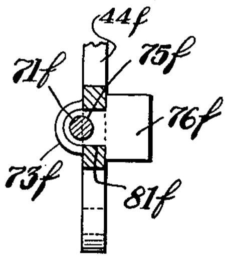
Figure 13:
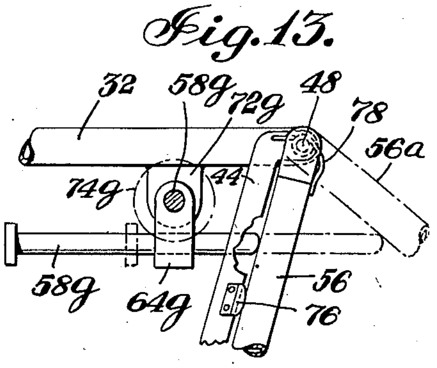
Figure 14:
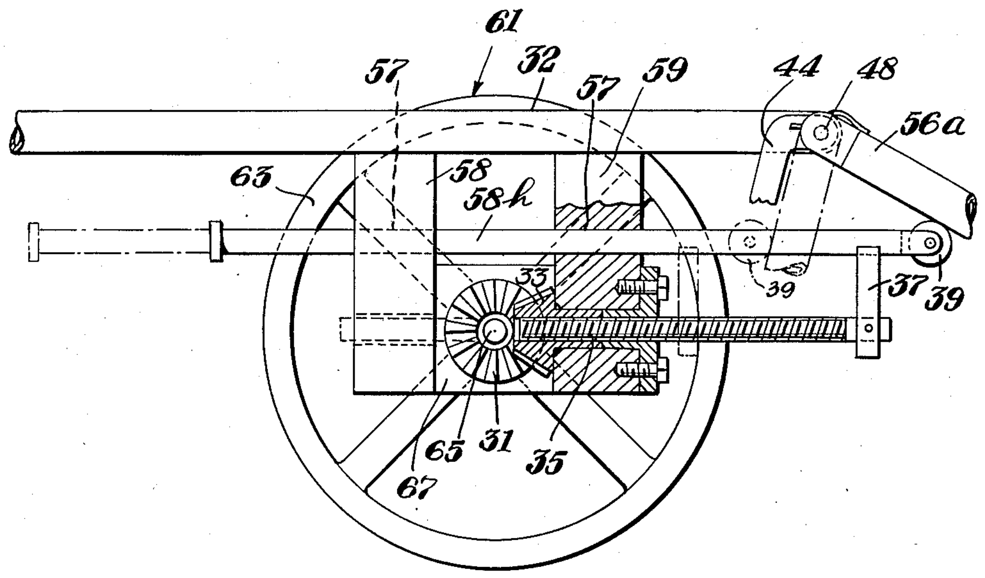
Figure 18:
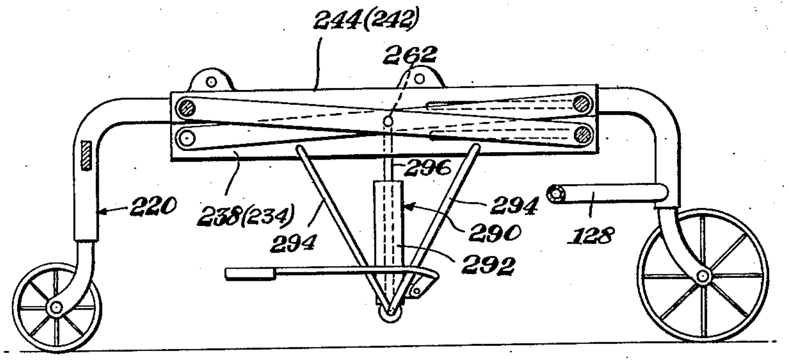
Figure 15:
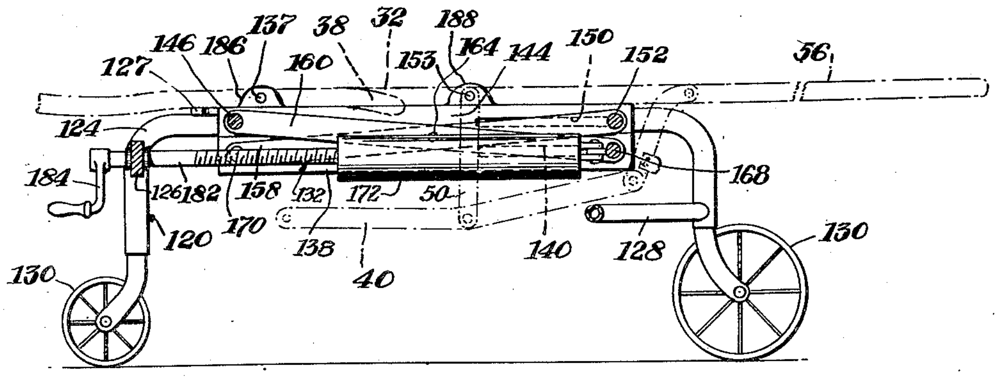
Figure 16:
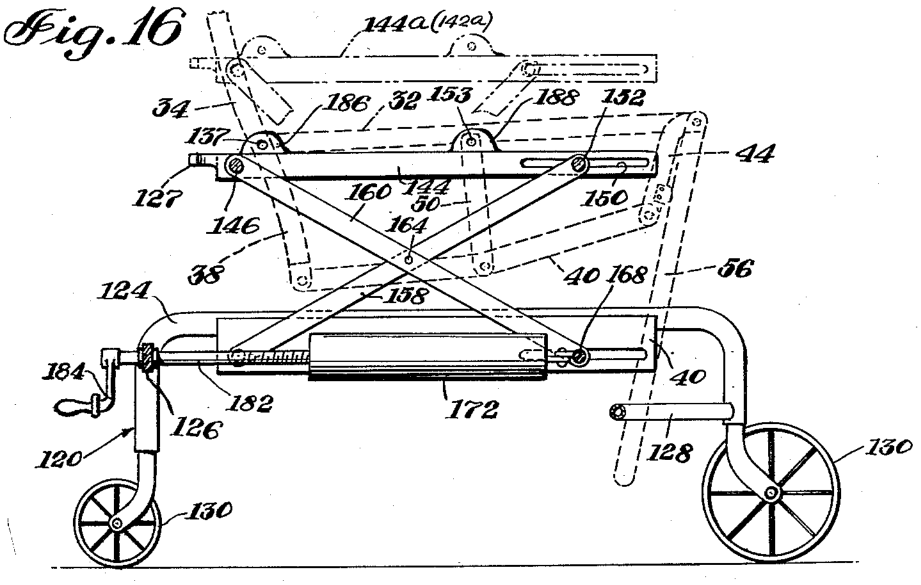
Figure 17:
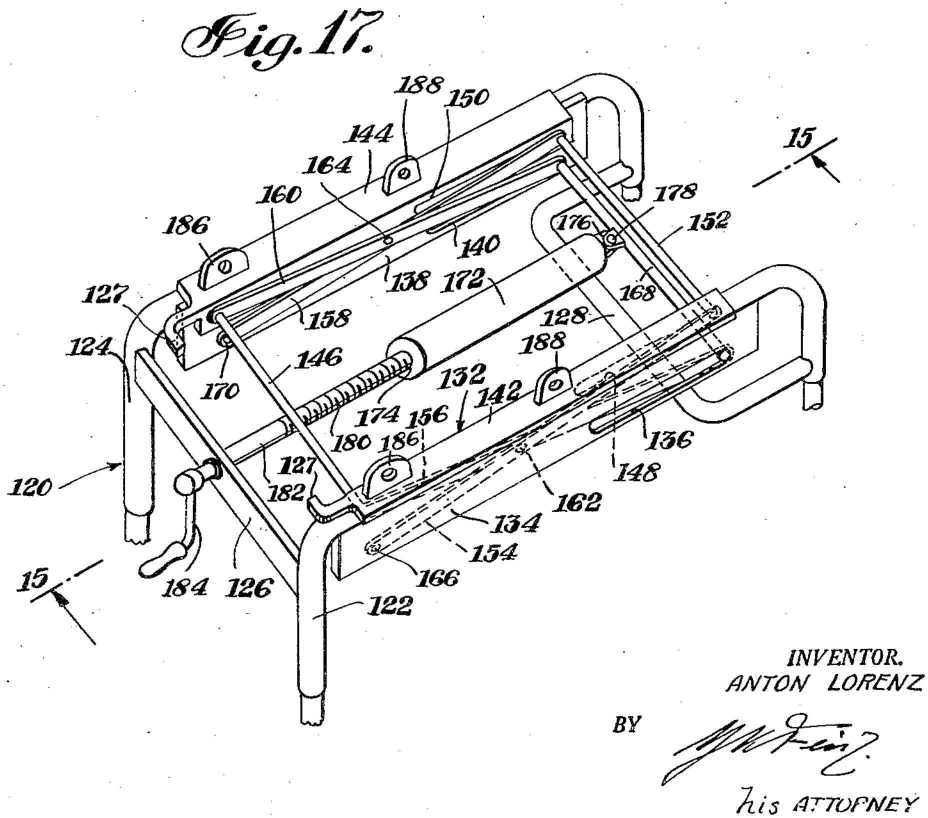
Figure 19:
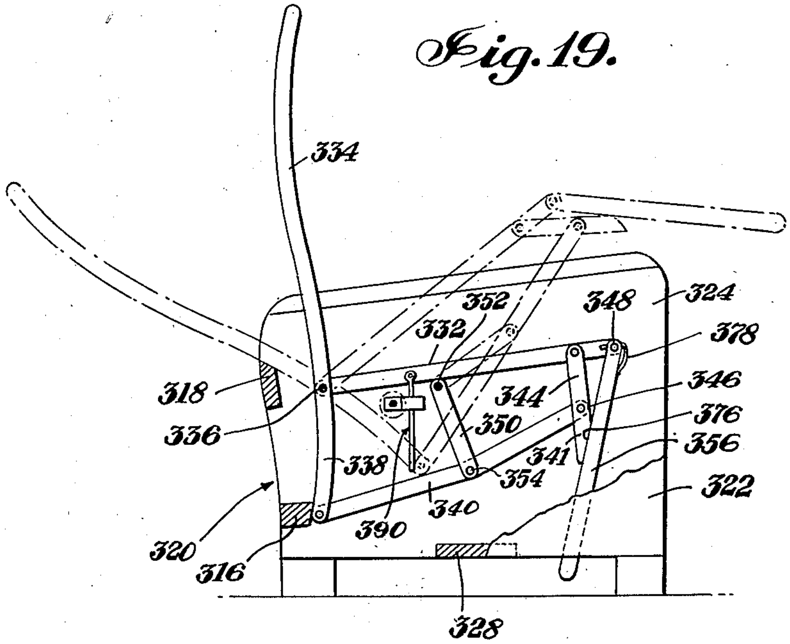

Fig. 8 is an elevational view of another embodiment of a controlling means for the leg-rest which may be used in the wheel chair shown in Fig. 1, Fig. 9 is a sectional view taken on line 9—9 of Fig. 8, Fig. 10 is an elevational view of a further embodiment of a controlling means for the leg-rest which may be used in the wheel chair shown in Fig. 1, Fig. 11 is an elevational view of still another embodiment of a controlling means for the leg-rest, which may be used in the wheel chair shown in Fig. 1, Fig. 12 is a sectional view taken on line 12—12 of Fig. 11, Fig. 13 is an elevational view of a different embodiment of a holding device for the leg-rest, Fig. 14 is an elevational view, partly in section, of a further embodiment of a holding device for the leg-rest, Fig. 15 is a vertical sectional view taken on line 15—15 of Fig. 17, of a different embodiment of an adjustable support for a reclining wheel chair of the type shown in Figs. 1 and 2, Fig. 16 is a sectional view of the adjustable support shown in Fig. 15, wherein, however, the adjustable means are shown in a different position, Fig. 17 is a perspective view of the adjustable support shown in Fig. 15, Fig. 18 is a vertical sectional view of a different embodiment of an adjustable support with a hydraulic actuating device, Fig. 19 is a front elevational view of a reclining arm-chair according to the invention, a portion of the side wall of said arm-chair being broken away so as to shown the mechanism of the chair.

Figure 20:
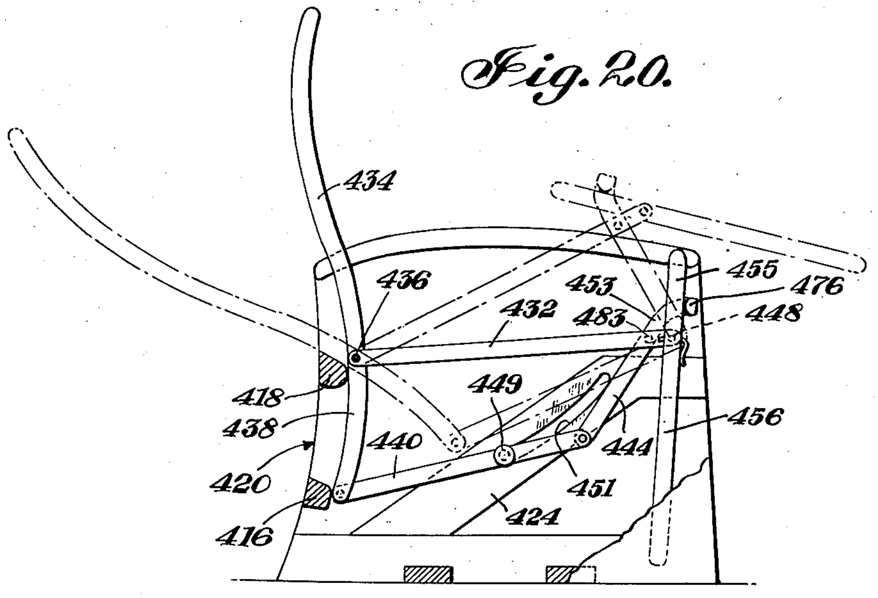
Figure 21:
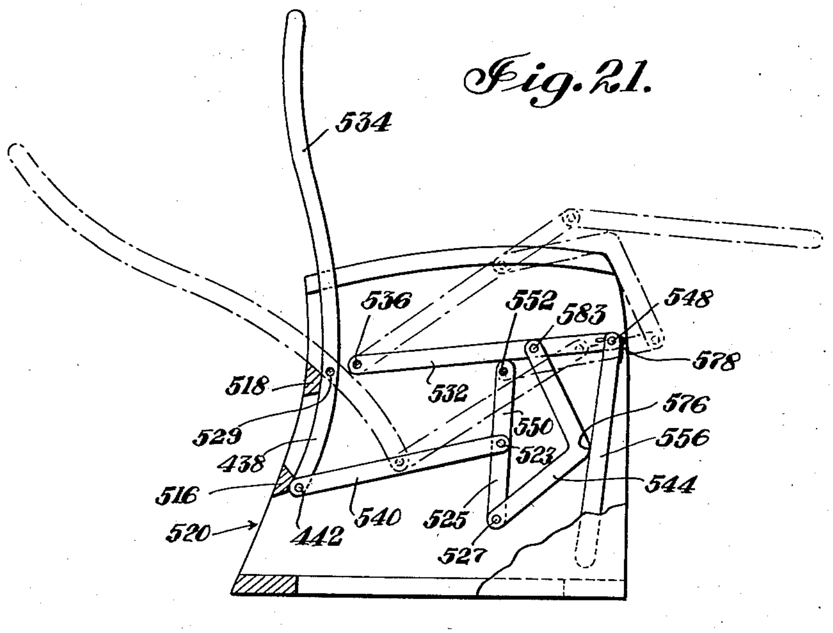
Figure 22:
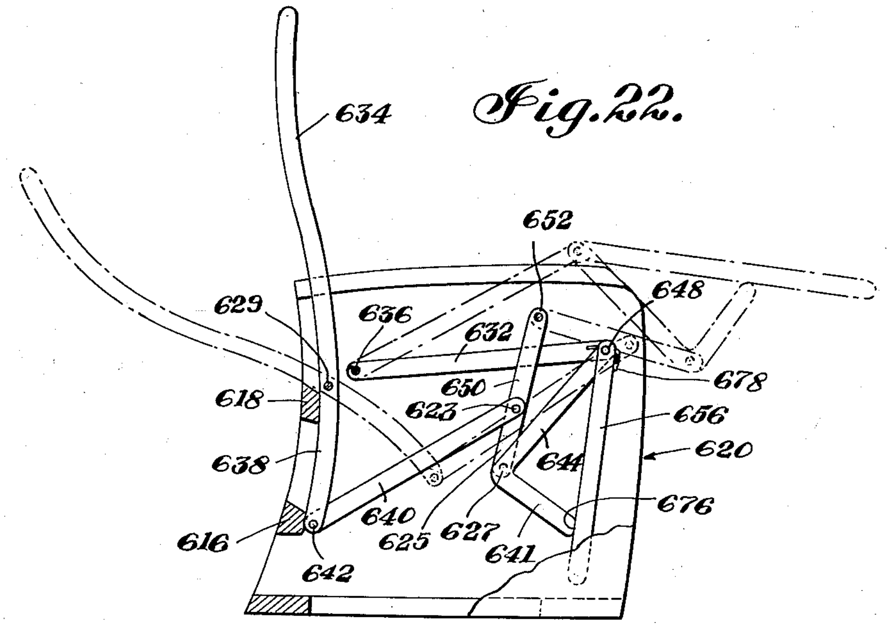

Fig. 20 is a side elevational view of another embodiment of a reclining arm-chair according to the invention, a portion of the side wall of the chair being broken away, Fig. 21 is a side elevational view of still another embodiment of a reclining arm-chair according to the invention, a portion of the side wall of the chair being broken away, Fig. 22 is a side elevational view of a further embodiment of a reclining arm-chair according to the invention, a portion of a side wall being broken away, and Fig. 23 is a fragmentary side elevational view of the front portion of a chair according to the invention, wherein the leg-rest is controlled by a controlling cam mounted on the lower connecting link of the polygonal structure.

Referring now to Fig. 1, 20 generally indicates the support of a wheel chair, which comprises side frames 22, 24 of tubular material connected with each other by cross bars 26 and 28. Wheels 30 are journalled in suitable bearings of said support 20 in any suitable manner.

The rear end of the seat 32 is pivoted to the support 20 and to the back-rest 34 at 36.

The back-rest 34 has an extension 38 projecting downwardly beyond said pivotal connection 36 between the back-rest, seat, and support. The rear end of a connecting link 40, hereinafter called the lower connecting link, is pivoted at 42 to said extension 38 of the back-rest, the front end of said lower connecting link 40 is pivoted to the lower end of a second connecting link 44, hereinafter called the front connecting link, at 46. The upper end of said front connecting link 44 is pivoted to the seat 32 at 48. Thus, the pivotally interconnected extension 38 of the back-rest, the pair of connecting links 40, 44, and the seat 32 form the movable members of a polygonal link-system in the shape of a quadrilateral link-system. Said quadrilateral link-system is swingably mounted on the support 20 at the pivotal connection 36 between the back-rest and the seat for movement about a single axis. The movements of the movable members of said quadrilateral link-system are controlled by a guiding link 50, the upper end of which is swingably mounted on the support 20 at 52, and the lower end of which is pivoted to the lower connecting link 40 at 54.

56 indicates a leg-rest comprising tubular side bars connected with each other in a suitable manner. The flattened upper end of each side bar of the leg-rest 56 is pivotally connected with the flattened front portion of the seat 32 at 48, so that the pivotal connection of the front connecting link 44 with the seat 32 and the pivotal connection of the leg-rest 56 with said seat 32 are coaxially arranged with each other.

As shown in Figs. 1, 4 and 5, a holding element or holding rod 58 pivotally connected at 60 with a lug 62 attached to the leg-rest 56 is in slidable engagement with a clamping sleeve 64, the free ends of which have bores 66 engaged with a bolt 68 inserted into an opening 70 of a lug 72 projecting downwardly from the seat 32. Said opening 70 of the lug 72 is of square shape cooperating with a corresponding square portion of the bolt 68, whereby the latter is prevented from undesired rotation. As long as a locking lever 74 screwed on the threaded end of the bolt 68 is loosened, the holding rod 58 may freely slide in the clamping sleeve 64 for free movements of the leg-rest 56. In order to control the movements of the leg-rest 56 in dependence on the movements of the movable members of the quadrilateral link-system 32, 38, 40, 44 controlled by the guiding link 50, the following controlling means are provided for the leg-rest 56. The front connecting link 44 has a controlling surface, which, in the embodiment shown in Figs. 1, 4, and 5, is formed by the surface of a cam 76 rigidly secured to the body of the connecting link 44. Said cam 76 is in loose contact at its controlling surface with the leg-rest 56, which is urged against said cam 76 by means of a spring 78.

On each side of the chair the rear end of an arm-rest 80 is pivoted to the back-rest 34 at 82, and the front end of said arm-rest is pivoted at 84 to one end of a link 86, the other end of which is pivoted to the seat at 88. The distance between the pivots 82 and 84 is equal and parallel to the distance between the pivots 36 and 88, and the distance between the pivots 82 and 36 is equal and parallel to the distance between the pivots 84 and 88.

The sitting position of the movable members of the reclining wheel chair is shown in full lines in Fig. 1. If the occupant of the chair leans the weight of his body against the back-rest, he may bring the movable members of the chair into a reclined position. The extreme reclined position 32′, 34′, 40′, 44′ of the members of the quadrilateral link-system is shown in dash and dot lines in Fig. 1. If, as shown in full lines in Fig. 1, the leg-rest 56 is in engagement with the controlling cam 76 when the movable members of the chair are in the sitting position, said controlling cam 76 causes a swinging of the leg-rest 56 about its pivot 48 from said full-line position into the position 56′, when the movable members of the quadrilateral link-system are brought into above described extreme reclined position 32′, 34′, 40′, 44′.

Of course, the movable members of the reclining wheel chair shown in Fig. 1 may be brought into any intermediate reclined position. If desired, the movable members of the reclining wheel chair may be held in any desired comfortable position by means of a locking device generally indicated by 90. As shown in Fig. 1 and Figs. 6 and 7, said locking device 90 comprises a locking rod 92 pivoted to the seat 32 at 94 and slidably engaged with a clamping sleeve 96. A supporting element 98 secured to a bracket 100 of tubular material is mounted on the side frame 22 of the support 20. A bolt 102 having a head 104 at one of its ends and having a threaded portion 106 at its other end passes through an aperture 108 of the supporting element 98, through the bore of a washer 110 interposed between the supporting element 98 and the clamping sleeve 96, through the bores of the clamping sleeve 96, and through the bore of a sleeve 112 slidably arranged in bores of the bracket 100 and interposed between the clamping sleeve 96 and a locking knob 114 screwed on the threaded end portion of the bolt 102. The aperture 108 of the supporting element 98 is of square shape and is engaged with a corresponding square portion of the bolt 102, whereby the latter is prevented from rotation when the adjusting knob 114 is turned. When the locking knob 114 is loosened, the locking rod 92 may freely slide in the clamping sleeve 96, and, consequently, the movable members of the chair may freely be moved from one position into another one. When the locking knob 114 is tightened, the sleeve 112 is urged against the clamping sleeve 96, whereby said clamping sleeve is tightened on the locking rod 92, so that the members of the chair are held in their position.

Furthermore, the locking rod 92 is provided with adjustable limiting means or stops 116 and 118 for limiting the extreme sitting position and the extreme reclined position of the movable members of the chair. As best shown in Fig. 7, said stops 116 and 118 are in the shape of rings mounted on the locking rod 92 provided with a series of threaded bores 117 and 119. Said rings or stops 116 and 118 may be adjusted in various positions by means of wing screws 113 and 115 respectively. The sitting position of the members of the chair is limited by an engagement of the ring 116 with the clamping sleeve 96 as shown in Figs. 1 and 7, and the extreme reclined position of the members of the chair is limited by an engagement of the ring 118 with said clamping sleeve 96.

As will be apparent from above description, although the controlling cam 76 may control the movements of the leg-rest 56 as described above, there is no positive connection between the controlling cam and the leg-rest. In other words, if the members 32, 38, 40, 44 of the quadrilateral link-system are held in a certain position by means of the locking device 90, and if the locking lever 74 of the holding device 58, 64, 68, 74 is loosened, the leg-rest 56 may be disengaged from the controlling cam 76 and may be freely swung about its pivot 48 into any desired position relative to the seat 32. If, for example, the seat 32 is in the sitting position shown in full lines in Fig. 1 and the reclining wheel chair is to be used by an occupant having a stiff leg, the leg-rest 56 may be swung about its pivot 48 into the position **56*a* in alignment with the seat. The leg-rest may be firmly held in said position 56*a* relative to the seat by tightening the locking lever 74 on the bolt 68. Now, if the occupant of the chair wishes to change from time to time the position of his body for relaxation, he may readily do so after loosening the knob 114 of the locking device 90 by leaning his body against the back-rest 34. If, for example, the occupant moves the movable members of the quadrilateral link-system into the extreme reclined position, wherein the back-rest and the seat are in the positions 34' and 32', the leg-rest is brought into the position 56*a'***. In other words, during the movement of the movable members of the quadrilateral link-system, the leg-rest remains always in alignment with the seat, so that a proper support of the leg of the occupant is assured for any position of the movable members of the quadrilateral link-system.

Under some circumstances, the condition of the leg of an occupant may require that the leg-rest be not held in alignment with the seat that, however, the angle between the leg-rest and the seat should be less than 180° during the swinging movements of the seat. It will be readily understood, that if the seat 32 is in the sitting position shown in full lines in Fig. 1, the leg-rest 56 may be brought into any desired position relative to the seat and may be held therein by means of the holding device 58, 68, 74. If the adjusted angle between the leg-rest and the seat is comparatively large, the extreme reclined position 34', 32' of the back-rest and the seat may be reached, as the controlling cam 76 will not come into engagement with the leg-rest 56. If, however, the adjusted angle between the leg-rest and the seat is rather small, the movable members of the quadrilateral link-system of the chair shown in Fig. 1 may be brought only into an intermediate reclined position, which is limited by the engagement of the controlling cam 76 with the leg-rest 56.

If it is desired, to reach the extreme reclined position of the movable members of the quadrilateral link-system of the chair shown in Fig. 1, irrespective of the degree of the adjusted angle between the leg-rest and the seat, the controlling cam 76 should be adjustably mounted on the front connecting link.

Fig. 8, for example, illustrates a front connecting link **44*d* having a lateral extension 45*d*. The front connecting link and said extension are provided with a series of holes 47*d*. A cam 76*d* having a pin 77*d* for engagement with one of said holes 47*d* may be arranged at a suitable place on the front connecting link or its extension. For example, the controlling cam 76*d* may be inserted into the first hole as shown in Fig. 8 and may be immovably held therein by a nut 79*d* screwed on the threaded end of its pin 77*d* projecting from the front connecting link 44*d* as shown in Fig. 9. Now, if for example the controlling cam 76*d* set in the first hole comes into engagement with the leg-rest 56 held at a comparatively small angle relative to the seat, when the movable members of the quadrilateral link-system are brought only into an intermediate reclined position, the controlling cam 76*d* may be removed from the first hole and may be inserted into one of the remaining holes 47*d*, wherein the controlling cam 76*d*** permits a further movement of the movable members of the quadrilateral link-system into the desired reclined position.

Fig. 10 illustrates a different embodiment of a front connecting link **44*e*, which may be substituted for the front connecting link 44 shown in Fig. 1. According to Fig. 10, the front connecting link 44*e* has two lateral extensions 43*e* and 45*e* at opposite sides of its main body. Each of said extensions 43*e* and 45*e* is provided with holes 47*e* for receiving the pin of the controlling cam 76*e*. The insertion of the controlling cam 76*e* into one of the holes in the extension 45*e* has the same results as described above in connection with the holes 47*d* arranged in the extension 45*d* of the front connecting link shown in Fig. 8. The holes 47*e* arranged in the extension 43*e* of the front connecting link 44*e*** shown in Fig. 10, however, serve a different purpose. If the locking lever 74 (see Figs. 1, 4 and 5) is loosened, the leg-rest is urged by means of the spring 78 against the controlling cam 76e inserted into one of the holes of the front connecting link. Now, if it is desired to increase the angle between the leg-rest and the seat when rendering ineffective the control of the leg-rest by the controlling cam 76e, the leg-rest is lifted by hand against the action of the spring 78, the controlling cam 76e is removed from the position shown in Fig. 10 and inserted into one of the holes 47e arranged in the extension 43e, whereupon the leg-rest is released for engagement with the controlling cam 76e by means of said spring.

Instead of a controlling cam detachably mounted on the front connecting link as shown in Figs. 8 and 10, an adjustable controlling cam of the type shown in Figs. 11 and 12 may be used. According to said figures, a threaded spindle 71f rotatably and axially immovably arranged in bearings of lugs 73f projecting from the main body of the front connecting link 44f and from its extension 45f respectively is in engagement with a threaded bore 75f of a controlling cam 76f slidably arranged in a slot 81f of the front connecting link and its extension. As will be readily understood, the controlling cam 76f may be adjusted in any desired position by turning the spindle 71f.

Fig. 23 illustrates a different embodiment of the arrangement of a controlling cam 76k in loose engagement with the leg-rest 56, which may be substituted for the arrangement of the controlling cam 76 shown in Figs. 1 and 4. According to Fig. 23, the lower connecting link 40k pivoted to the front connecting link 44k at 46 is provided with an extension 99k, and the controlling cam 76k is secured to said extension 99k by screws. The front connecting link 44k has no controlling surface. In this case, the movements of the leg-rest 56 pivoted to the seat 32 at 48 and held in loose contact with the controlling cam 76k by the spring 78 are controlled by said controlling cam 76k in dependence on the movements of the lower connecting link 40k.

Fig. 13 illustrates a different holding device, which may be substituted for the holding device 58, 68, 74 shown in Figs. 1, 4 and 5. According to Fig. 13, a lifting element or lifting rod 58g is slidably engaged with a clamping sleeve 64g of the type shown in Figs. 4 and 5. The end of the lifting rod 58g is in loose contact with the leg-rest 56. The lifting rod 58g may be held in any adjusted position by means of an adjusting knob 74g screwed on the threaded end of a bolt 58g engaged with the clamping sleeve 64g and a lug 72g mounted on the seat 32. If it is desired, to bring the leg-rest 56 from the sitting position shown in full lines into the position 56a at a different angle to the seat 32, the adjusting knob 74g is loosened, and the leg-rest is disengaged from the controlling cam 76 carried by the front connecting link 44 and is lifted into said position 56a by shifting the lifting rod 58g in the sleeve 64g; thereupon, the adjusting knob 74g is tightened, so that the lifting rod 58g is held in its position by the clamping sleeve 64g with the result, that the leg-rest is held in the position 56a. Now, if the movable members of the quadrilateral link-system are swung into a reclined position by swinging the back-rest 34 (Fig. 1) about its pivot 36 on the support, the leg-rest will remain in the position 56a (Fig. 13) at the adjusted angle relative to the seat 32, until the movable members of the quadrilateral link-system come into a position, wherein the controlling cam 76 contacts the leg-rest. If the movement of the movable members of the quadrilateral link-system is continued, the controlling cam 76 now in engagement with the leg-rest causes an increase of the angle between the leg-rest and the seat, until the leg-rest reaches the position 56a′ (Fig. 1) when the back-rest and seat are in the extreme reclined position 34′, 32′.

Fig. 14 illustrates still another embodiment of a holding device for the leg-rest, which may be substituted for the holding device 58, 68, 74 shown in Figs. 1, 4 and 5. According to Fig. 14, a lifting element or lifting rod 58h is slidably arranged in bores 57 of brackets 59 carried by the seat 32. The lifting rod 58h may be axially displaced by means of an actuating device, generally indicated by 61, which may be operated by the occupant while resting in the chair. Said acuating device comprises a wheel 63 keyed to one end of a shaft 65 journalled in a bearing of a member 67 secured to the brackets 59. A bevel gear 31 secured to the other end of said shaft 65 is in mesh with a bevel gear 33 rotatably and axially immovably mounted in the bracket 59. The bevel gear 33 has a threaded bore in engagement with a threaded spindle 35; said spindle 35 may be displaced in the direction of its longitudinal axis but is prevented from rotation by a member 37 rigidly connected with its right-hand end and the right-hand end of the lifting rod 58h. Therefore, if the wheel 63, which may be reached by the occupant while resting in the chair, and the bevel gears 31, 33 connected with said wheel are rotated, the spindle 35 and the lifting rod 58h connected therewith are axially displaced. The mechanism of the actuating device is of the self-locking type, so that the leg-rest will be held in the position 56a (shown in full lines) by a roller 39 journalled on the lifting rod 58h during a movement of the quadrilateral link-system into a reclined position, until the controlling cam 76 (Fig. 1) mounted on the front connecting link 44 contacts the leg-rest, whereupon, during further movements of the quadrilateral link-system into a more reclined position, the movements of the leg-rest are controlled by said controlling cam.

It has been found, that a reclining wheel chair according to Figs. 1, 2, and 4–14 is of great comfort to occupants with stiff legs, as the occupants are no longer bound to sit for a longer time in one and the same position as is the case with the hitherto customary wheel chairs, but may change the position of the body from time to time and yet have at all times a sufficient support of a stiff leg by a proper adjustment of the angle between the leg-rest and the seat. Furthermore, it may be mentioned, that the leg-rest may be made of two parts arranged adjacent to each other as shown in Fig. 3, one part 56b for the support of the right leg and the other part 56c for the support of the left leg. In such a case the parts 56b and 56c are swingably mounted on a transverse rod 48i of the seat 32i pivoted in a suitable manner to the support 20i comprising the side frames 22i and 24i connected with each other by the transverse rods 26i and 28i. Furthermore, in such a case, a controlling cam 76b, 76c and a holding device 58b, 58c are arranged on each side of the chair for cooperation with each of said parts 56b, 56c of the leg-rest. Such an arrangement has the advantage, that only the part for the support of the stiff leg of the occupant may be held in the required position relative to the seat by means of the holding device 58b or 58c, while the other part may remain in engagement with the controlling cam 76b or 76c for controlled movements in dependence on the movements of the quadrilateral link-system.

According to the invention, at least one connection between the movable members of the quadrilateral link-system is disengageable. For example, the pivot 42 between the extension 38 of the back-rest 34 and the lower connecting link 40 may be removed. If said pivot is removed, the back-rest will swing about the pivot 36 until it abuts against the transverse rod 26 acting as limiting means for holding the back-rest in a substantially horizontal position 34z as shown in Fig. 2. When the back-rest is brought into said position 34z for converting the reclining wheel chair into a couch-like furniture, the ring or stop 116 on the locking rod 92 of the locking device 90 is adjusted in such a manner, that after a loosening of the locking knob 114 the seat drops into a substantially horizontal position 32z substantially in alignment with the back-rest 34. Owing to the arrangement of the pivots 36, 82, 84, 88 at the corners of a parallelogram, the arm-rest 80 and the link 86 will be in planes adjacent to the back-rest and the seat, when said two members are in above mentioned horizontal position. Furthermore, as shown in Fig. 2, the leg-rest is held in the horizontal position 56z in alignment with the seat by means of the holding device 58, 64, 74. After such a conversion of the wheel chair into a couch-like furniture, said article of furniture may be placed next to the bed of a patient whereupon the patient may be readily transferred without strain for either the patient or the nurse onto the article of furniture. After such a transfer, the back-rest is swung upwardly, and its extension 38 is again connected with the lower connecting link 40 by means of the pivot, so that now the patient may rest comfortably in the reclining wheel chair, which may be adjusted from time to time in accordance with the patient's wishes.

If above described convertible reclining wheel chair is to be used in places, where the level of a bed is higher or lower than the level of the seat 32 permitting the leg-rest 56 to be brought into the position shown in Fig. 1, preferably the support 20 of the chair shown in Figs. 1 and 2 is replaced by a support generally indicated by 120 in Figs. 15, 16 and 17. Said adjustable support 120 comprises the two side frames 122 and 124 connected with each other by means of transverse rods 126 and 128. Each of the four legs of the support 120 is provided with a wheel 130 journalled in suitable bearings.

An elevating device generally indicated by 132 is mounted on the side frames 122, 124 of the support 120. Said elevating device 132 comprises a first base member or plate 134 provided with a longitudinal slot 136 and secured to the side frame 122 in any suitable manner, and a second base member or plate 138 provided with a longitudinal slot 140 and secured to the side frame 124 in any suitable manner. Furthermore, said elevating device 132 comprises two carrying elements or supporting bars 142, 144 connected with each other by a transverse rod 146 journalled in bores of said supporting bars. Each of said carrying bars 142, 144 are provided with a longitudinal slot 148 and 150 respectively. A transverse rod 152 is slidably arranged in said slots 148 and 150. A lifting mechanism in the shape of a lazy-tong mechanism is interposed between the base members 134, 138 and the carrying members 142, 144. Said lifting mechanism comprises a pair of bars 154, 156 on one side and a pair of bars 158, 160 on the other side of the elevating device. The bars 154, 156 are pivotally connected with each other at 162, the bars 158, 160 are pivotally connected with each other at 164. One end of the bar 154 is pivotally connected with the base member 134 at 166, the other end of said bar 154 is connected with the slidable transverse rod 152. One end of the bar 156 is connected with the rotatable transverse rod 146, the other end of said bar 156 is connected with a transverse rod 168 slidably arranged in the slots 136 and 140 of the base members 134 and 138. Likewise, one end of the bar 158 is pivotally connected with the base member 138 at 170, the other end of said bar 158 is connected with the slidable transverse rod 152. Furthermore, one end of the bar 160 is connected with the rotatable transverse rod 146, and the other end of siad bar 160 is connected with the slidable transverse rod 168. One end of a cylindrical member 172 having a threaded bore 174 is pivotally connected with a lug 176 on the slidable transverse rod 168 at 178. The threaded end 180 of a spindle 182 rotatably but axially immovably arranged in the transverse bar 126 is connected with the threaded bore 174 of the cylindrical member 172. A crank 184 is secured to the spindle 182 for rotating same by hand.

Figs. 15 and 17 illustrate the carrying members 142, 144 in the lowermost position. When the spindle 182 is rotated, the cylindrical member 172 is displaced in left-hand direction (as viewed in the figures), whereby the transverse rods 168 and 152 are displaced in the slots of the base members and carrying members respectively, so that the carrying members 142, 144 are lifted through planes parallel to each other. For example, the carrying members 142, 144 may be brought into an intermediate elevated position as shown in Fig. 16 or into an extreme elevated position as shown in dash and dot lines in said Fig. 16. Upon a rotation of the spindle 182 in reversed direction, the carrying members 142, 144 may be lowered into any desired position. Preferably, the spindle mechanism is of the self-locking type, so that the carrying members 142, 144 will be held in any adjusted position; however, a locking device may be associated with the elevating device for locking the carrying elements 142, 144 in an adjusted position, if desired.

The carrying bars 142, 144 associated with each other in above described manner form a platform on which the quadrilateral link-system of the convertible reclining wheel chair shown in Figs. 1 and 2 may be mounted. Figs. 15 and 16 illustrate only a few elements of the chair structure proper. The seat 32 and the back-rest 34 are pivoted at 137 to lugs 186 mounted on the carrying bars 142 and 144. The upper end of the guiding link 50 is pivoted at 153 to lugs 188 mounted on the carrying bars 142, 144. Furthermore, the carrying bars 142 and 144 are provided with stops 127. As will be readily understood, the entire chair mechanism is lifted or lowered relative to the support 120 together with a lifting or lowering of the carrying bars 142, 144, by means of above described elevating device 132. Furthermore, as the left-hand end (as viewed in Figs. 15–17) of each lazy-tong 154, 156 and 158, 160 is pivotally connected with a base member 134, 138 and a carrying member 142, 144 at points in vertical alignment with each other, and as the right-hand end of each lazy tong is slidably engaged with horizontal slots 136, 148 or 140, 150 in such a base member and carrying member, the carrying members are displaced in horizontal planes parallel to each other relative to the support 120, so that the center of gravity of the body resting on the chair mechanism carried by the carrying members is not displaced from a vertical line, whereby the article of furniture is prevented from an undesired tilting during a lifting or lowering of the chair mechanism.

The reclining chair mounted on the adjustable support shown in Figs. 15–17 may be used as follows:

Assuming, the bed of a patient is at the level of the seat 32 shown in Fig. 15. The carrying means 142, 144 are lowered into the position shown in Fig. 15. The extension 38 of the back-rest 34 is disengaged from the lower connecting link 40 and swung into the substantially horizontal position shown in Fig. 15 in dash lines, wherein it is held by the stops 127. The seat 32 is brought into the horizontal position shown in Fig. 15, wherein it is held by the above described limiting means on the locking device 90 (Fig. 2) not shown in Fig. 15. The leg-rest 56 is brought into the horizontal position shown in Fig. 15, wherein it is held by the holding device 58, 64, 74 (Fig. 2) not shown in Fig. 15. The thus converted reclining chair is placed next to the bed of the patient whereupon the patient may be transferred onto the converted reclining chair. Now, the carrying bars 142, 144 are brought into a level sufficiently high above the ground, for example said carrying bars are brought into the position shown in full lines in Fig. 16. Thereafter, the extension 38 of the back-rest 34 may be connected with the rear end of the connecting link 40 and the article of furniture may be used as a reclining wheel chair as indicated in Fig. 16.

If the patient shall be put back to bed, above described steps are reversed.

If the bed should be at a high level, the carrying bars 142, 144, supporting the chair mechanism may be brought into a position higher than that shown in full lines in Fig. 16, for example into the position 142*a*, 144*a* shown in dash and dot lines in Fig. 16, so as to render possible an easy transfer of the patient from the bed onto the converted reclining chair.

Fig. 18 illustrates a different embodiment of an adjustable support 220 for carrying the mechanism of the reclining chair shown in Figs. 1 and 2. Again, the base members 234, 238 are secured to the support 220, and again a lifting mechanism in the shape of a lazy-tong mechanism is interposed between said base members 234, 238, and the displaceable carrying bars 242, 244. However, according to Fig. 18, said lifting mechanism may be actuated by a hydraulic device generally indicated by 290. The stationary member 292 of said hydraulic device is secured to the base elements 234, 238 by means of rods 294, and the movable member 296 is connected with a transverse bar 262 connecting the two pairs of bars of the lazy-tong mechanism with each other.

Instead of above described hydraulic device, of course any other mechanical device, for example an electromotor could be used for actuating the elevating device.

Fig. 19 illustrates a different embodiment of a reclining chair according to the invention in the shape of an arm-chair. The side frames 322, 324 of the support 320 are connected with each other by cross bars 316, 318, and 328. The seat 332 and the back-rest 334 are pivoted to the support 320 at 336. In the same manner as in Fig. 1, the pivotally interconnected seat 332, extension 338 of the back-rest, lower connecting line 340 and front connecting link 344 form the movable members of a polygonal link-system in the shape of a quadrilateral link-system swingably mounted on the support 320 at 336. The movements of the members of said quadrilateral link-system are controlled by a guiding link 350 pivoted to the support at 352 and to the lower connecting link at 354.

The front connecting link 344 of the chair shown in Fig. 19 is provided with an extension 341 extending beyond its pivotal connection 346 with the lower connecting link. Said extension 341 of the front connecting link has a surface 376 which may act as a controlling surface for controlling the movements of the leg-rest 356 swingably mounted on the seat 332 at 348 and held in loose engagement with said controlling surface 376 by means of a spring 378.

The operation of the reclining arm-chair shown in Fig. 19 is the same as the operation of the reclining wheel chair shown in Fig. 1. The sitting position is limited by a cross bar 316. When the members of the chair are brought into a reclined position, for example into the extreme reclined position shown in dash and dot lines and limited by the cross bar 318, the movements of the leg-rest 356 are controlled by the cam surface 376, when the leg-rest is held in engagement with said controlling surface. The members of the chair may be held in any desired position by means of a locking device 390. Fig. 19 does not illustrate a holding device for holding the leg-rest at a predetermined angle relative to the seat, but it is understood that any suitable holding device may be applied to the reclining arm-chair shown in Fig. 19, for example a holding device as shown in Figs. 4, 5, or 13 or 14.

In the embodiment of a reclining arm-chair shown in Fig. 20, the seat 432 and the back-rest 434 are pivoted to the support 420 at 436. Again, the quadrilateral link-system is formed by the seat 432, the extension 438 of the back-rest, the lower connecting link 440, and the front connecting link 444 pivotally connected with each other. The movements of said quadrilateral link-system, however, are controlled by guiding cam means, which comprise a first guiding element or pin 449 mounted on the lower connecting link 440 and slidably engaged with a second guiding element or slot 451 arranged in a stationary portion of the side frame 424 of the support 420.

The leg-rest 456 swingably mounted on the seat 432 at 448 has an upward extension 455 extending beyond the pivot 448. Likewise, the front connecting link 444 has an upward extension 453 extending beyond its pivotal connection 483 with the seat 432. The pivot 483 is spaced from the pivot 448 between the leg-rest and the seat. The extension 453 of the front connecting link 444 has a cam-like controlling surface 476 in loose contact with the extension 455 of the spring-loaded leg-rest 456. The sitting position of the movable members of the chair limited by the cross bar 416 is shown in full lines. When the back-rest 434 is swung about the pivot 436, the movable members of the chair are brought into a reclined position, for example into the extreme reclined position shown in dash and dot lines and limited by the cross bar 418 of the support. Fig. 20 does not show a locking device for holding the movable members of the chair in a desired position and does not show a holding device for holding the leg-rest in a certain position relative to the seat; however, it is understood, that any of the locking devices or holding devices shown in Figs. 1, 4–7, 13, 14, or 19 may be applied to the reclining chair shown in Fig. 20 for the same purposes.

According to the embodiment of a reclining chair shown in Fig. 21 the seat 532 is pivoted to the support 520 at 536. The back-rest 534 is pivoted to the support at the point 529 spaced from the pivot 536. The rear end of the lower connecting link 540 is pivoted to the extension 438 of the back-rest 534 at 442. The other end of said lower connecting link 540 is pivoted at 523 to an intermediate connecting link 525 which is integral with or rigidly connected with the guiding link 550 pivoted to the support at 552. The lower end of the intermediate link 525 is pivoted at 527 to one end of the front connecting link 544, the other end of which is pivoted to the seat 532 at 583. Thus, the extension 438 of the back-rest, the lower connecting link 540, the intermediate connecting link 525, the front connecting link 544, and the seat 532 form the movable members and the stationary portion of the support between the pivots 529 and 536 forms the stationary member of a polygonal link-system in the shape of a hexagonal link-system; the movements of said hexagonal link-system are controlled by the guiding link 550.

The front connecting link 544 has a bend and the apex 576 of said bend forms the controlling surface for loose contact with the leg-rest 556 pivoted to the seat 532 at 548 and urged against said controlling surface by means of the spring 578.

The sitting position of the members of the chair limited by the cross bar 516 is shown in full lines. When the back-rest 534 is swung about its pivot 529, the members of the chair may be brought into a reclined position for example into the extreme reclined position shown in dash and dot lines in Fig. 21 and limited by the cross bar 518. Fig. 21 does not show a locking device for holding the movable members of the chair in a desired position and does not show a holding device for holding the leg-rest in a certain position relative to the seat; however, it is understood that any of the locking devices or holding devices shown in Figs. 1, 4–7, 13, 14, or 19 may be applied to the reclining chair shown in Fig. 21 for the same purposes.

The reclining arm-chair shown in Fig. 22 is provided with substantially the same mechanism as the reclining arm-chair shown in Fig. 21, with the exception, however, that the pivotal connection 652 of the guiding link 650 with the support 620 is arranged above the plane of the seat 632 pivoted to the support at 636 and that the front connecting link 644 is of different shape. According to Fig. 22 the front connecting link 644 pivoted to the seat 632 and leg-rest 656 at 648 and pivoted to the intermediate connecting link 625 at 627 has an extension 641 provided with a controlling surface 676 for loose contact with the leg-rest 656 held against said controlling surface by means of the spring 678. The intermediate connecting link 625 rigidly connected with a guiding link 650 is pivoted at 623 to one end of the lower connecting link 640, the other end of which is pivoted at 642 to the extension 638 of the back-rest 634 pivoted to the support at 629. The sitting position of the movable members of the chair limited by the cross bar 616 is shown in full lines. When the back-rest 634 is swung about the pivot 636, the movable members of the chair are brought into a reclined position, for example into the extreme reclined position shown in dash and dot lines and limited by the cross bar 618 of the support. Fig. 22 does not show a locking device for holding the movable members of the chair in a desired position and does not show a holding device for holding the leg-rest in a certain position relative to the seat, however, it is understood, that any of the locking devices or holding devices shown in Figs. 1, 4–7, 13, 14, or 19 may be applied to the reclining chair shown in Fig. 22 for the same purposes.

I have described preferred embodiments of my invention, but it is understood that this disclosure is for the purpose of illustration, and that various omissions or changes in shape, proportion, and arrangement of parts, as well as the substitution of equivalent elements for those, herein shown and described may be made without departing from the spirit and scope of the invention as set forth in the appended claims.

What I claim is:

1. A reclining article of furniture, comprising: a support, a structure including a back-rest-member having a downward extension, a seat-member and means connecting said seat-member with the downward extension of said back-rest-member for controlling the movements of said back-rest-member and said seat-member in dependence on each other, said means including a chain of connecting links and guiding means, said guiding means being connected to said support and engaged with one of said connecting links, at least one of said connecting links being arranged below the plane of the seat-member, the ends of said chain of connecting links being pivoted to the seat-member and the downward extension of the back-rest-member at spaced points, means pivotally connecting at least one of said back-rest and seat-members to said support, a leg-rest, said leg-rest being pivoted to the front portion of said seat-member, and cooperating abutting surfaces arranged on one of said connecting links and on said leg-rest for controlling the movements of said leg-rest in dependence on the movements of said connecting link, said cooperating abutting surfaces loosely abutting against each other whereby said abutting surfaces may be disengaged from each other for the performance of independent movements of the leg-rest relative to the seat-member.

2. A reclining article of furniture as claimed in claim 1, said chain of connecting links including a front connecting link pivoted to said seat-member and a lower connecting link pivoted at its rear end portion to said extension of the back-rest-member, and one of said abutting surfaces being arranged at said front connecting link.

3. A reclining article of furniture as claimed in claim 1, said guiding means including a guiding link pivoted at one of its end portions to said support and pivoted at its other end portion to at least one of said connecting links.

4. A reclining article of furniture as claimed in claim 1, said connecting links including a front connecting link pivoted to said seat-member and a lower connecting link pivoted at its rear end portion to said extension of the back-rest-member, said guiding means including a guiding link pivoted at one of its end portions to said support and pivoted at its other end portion to said lower connecting link, and one of said abutting surfaces being arranged at said front connecting link.

5. In combination with a reclining article of furniture as claimed in claim 1, holding means disposed on said seat for adjustably holding said leg-rest in a predetermined position relative to the seat.

6. In combination with a reclining article of furniture as claimed in claim 1, a slide member secured to said leg-rest, and a clamping member mounted on the seat and adapted for adjustably gripping said slide member whereby the leg-rest may be maintained at a predetermined position relative to the seat.

7. In combination with a reclining article of furniture as claimed in claim 1, resilient means arranged on said article for yieldingly urging said cooperating abutting surfaces into relative contact.

8. In combination with a reclining article of furniture as claimed in claim 1, locking means arranged on one of the movable members of said structure and said support, said locking means being adapted to adjustably lock the members of said structure in a predetermined position relative to said support.

9. In a reclining article of furniture as claimed in claim 1, the connection of one movable member of said structure to one other member thereof being disengageable.

10. In a reclining article of furniture as claimed in claim 1, the connection between the downward extension of the back-rest-member and the adjacent connecting link being disengageable, and abutment means being arranged on said support for maintaining said back-rest-member in a position substantially aligned with the seat.

11. In a reclining article of furniture as claimed in claim 1, said connecting links including a front connecting link pivoted to said seat and a lower connecting link pivoted at its rear end portion to said extension of the back-rest-member, and the connections of the leg-rest and front connecting link to the seat being in coaxial relationship.

12. A reclining article of furniture as claimed in claim 1, said chain of connecting links including a front connecting link pivoted to said seat member and a lower connecting link pivoted at its rear end portion to said extension of the back-rest-member, said front connecting link having an extension, and one of said abutting surfaces being arranged at said extension of the front connecting link.

13. A reclining article of furniture as claimed in claim 1, said chain of connecting links including a front connecting link pivoted to said seat member and a lower connecting link pivoted at its rear end portion to said extension of the back-rest-member, and one of said abutting surfaces forming a part of a member adjustably mounted on said front connecting link.

14. A reclining article of furniture as claimed in claim 1, said chain of connecting links including a front connecting link pivoted to said seat member and a lower connecting link pivoted at its rear end portion to said extension of the back-rest-member, and an extension on said front connecting link, projecting from the latter substantially in a direction parallel to the longitudinal axis of the article, one of said abutting surfaces forming a part of a member adjustably mounted on said extension of the front connecting link.

15. A reclining article of furniture as claimed in claim 1, said chain of connecting links including a front connecting link pivoted to said seat member and a lower connecting link pivoted at its rear end portion to said extension of the back-rest-member, one of said abutting surfaces forming a part of a member detachably and adjustably mounted on said front connecting link, and means for holding said detachable member in a predetermined position on said front connecting link.

16. In combination with a reclining article of furniture as claimed in claim 1, a carriage, and elevating means mounted on said carriage and engaged with said support for displacing the latter upwardly and downwardly relative to said carriage.

17. In combination with a reclining article of furniture as claimed in claim 1, a carriage, and elevating means mounted on said carriage and engaged with said support for displacing the latter upwardly and downwardly relative to said carriage, said elevating means incuding a mechanism in the shape of a lazy-tong and an actuating device connected with the latter for operating same.

18. A reclining article of furniture as claimed in claim 1, said chain of connecting links including a front connecting link pivoted to said seat member and a lower connecting link pivoted at its rear end portion to said extension of the back-rest-member, said front connecting link having a first upward extension, said leg-rest having a second upward extension, one of said abutting surfaces being arranged at said first extension of the front connecting link, and the other abutting surface being arranged at said second extension of the leg-rest.

ANTON LORENZ.

REFERENCES CITED

The following references are of record in the file of this patent:

UNITED STATES PATENTS

| Number | Name | Date |
|---|---|---|
| 374,628 | Pynchon | Dec. 13, 1887 |
| 484,371 | Pynchon | Oct. 18, 1892 |
| 556,343 | Fleer | Mar. 17, 1896 |
| 581,670 | Wilkerson | Apr. 27, 1897 |
| 688,443 | Siccardi | Dec. 10, 1901 |
| 941,555 | Berzon et al. | Nov. 30, 1909 |
| 1,937,056 | Cuthell | Nov. 28, 1933 |
| 2,276,053 | Luckhardt et al. | Mar. 10, 1942 |

FOREIGN PATENTS

| Number | Country | Date |
|---|---|---|
| 10,918 | Great Britain | 1845 |
| 24,528 | Switzerland | July 8, 1901 |